United States Patent [19]
Krepak

[11] 3,768,310
[45] Oct. 30, 1973

[54] DIGITAL THERMOMETER

[76] Inventor: John C. Krepak, 306 Milam St., Shreveport, La. 71102

[22] Filed: Oct. 1, 1971

[21] Appl. No.: 185,588

[52] U.S. Cl. .......... 73/362 AR
[51] Int. Cl. .......... G01k 7/24
[58] Field of Search .......... 73/362 AR

[56] References Cited

UNITED STATES PATENTS

| | | | |
|---|---|---|---|
| 3,274,832 | 9/1966 | Hamilton | 73/339 R |
| 3,477,292 | 11/1969 | Thornton | 73/362 AR |
| 3,620,082 | 11/1971 | Peters | 73/362 AR |

*Primary Examiner*—Richard C. Queisser
*Assistant Examiner*—Frederick Shoon
*Attorney*—J. Vincent Martin et al.

[57] ABSTRACT

A method and apparatus for measuring temperature within a preselected range of temperatures wherein the temperature is measured electronically and displayed digitally. A first electrical signal having a variable time duration proportional to the temperature being measured is compared with a second electrical signal having a preselected constant time duration indicative of the temperature comprising one end of the preselected range of temperatures. Counting, determining and display components of the apparatus function responsive to this comparison.

19 Claims, 6 Drawing Figures

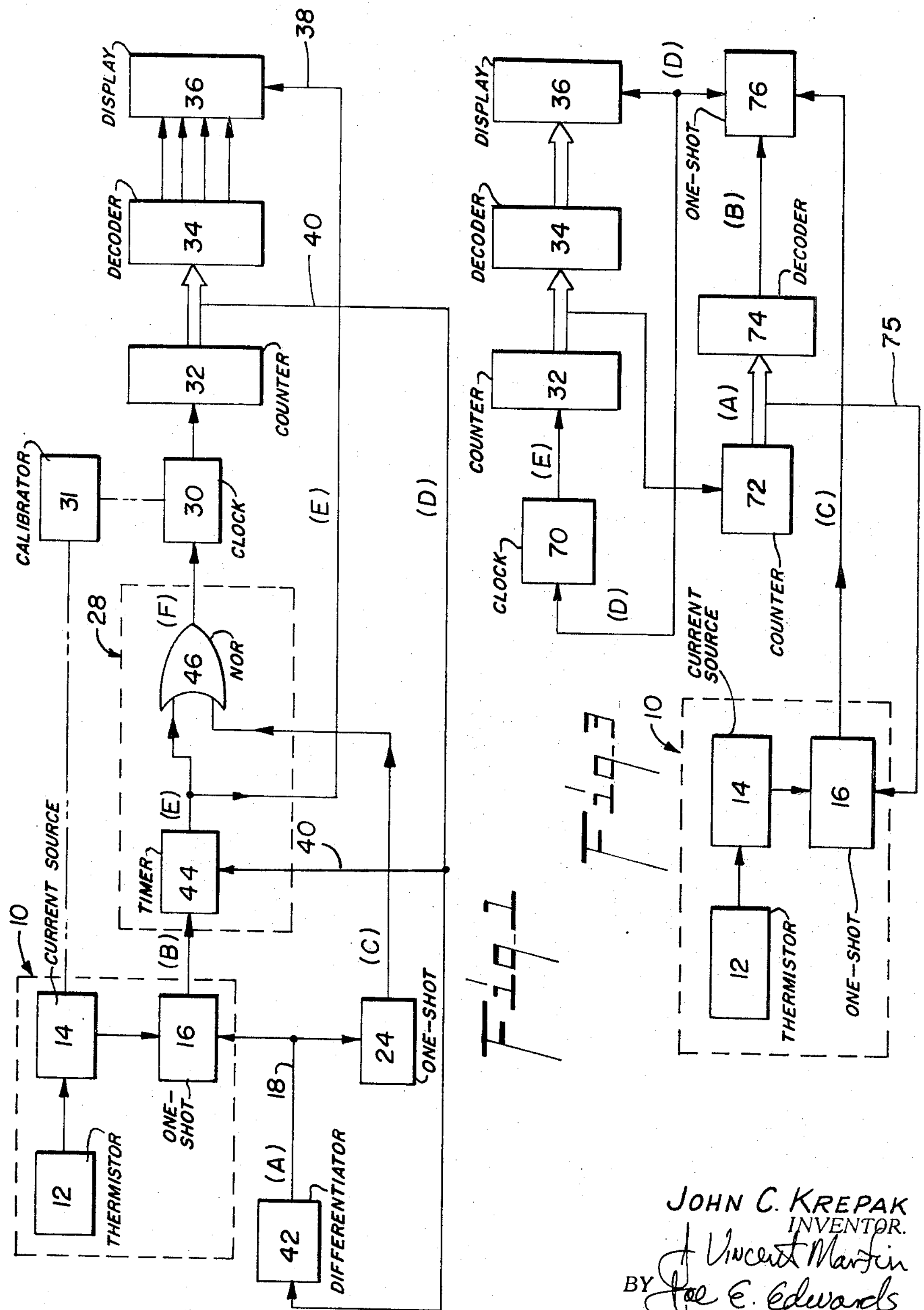
JOHN C. KREPAK
INVENTOR.
BY J. Vincent Martin
Joe E. Edwards
Jack R. Springgate
ATTORNEYS

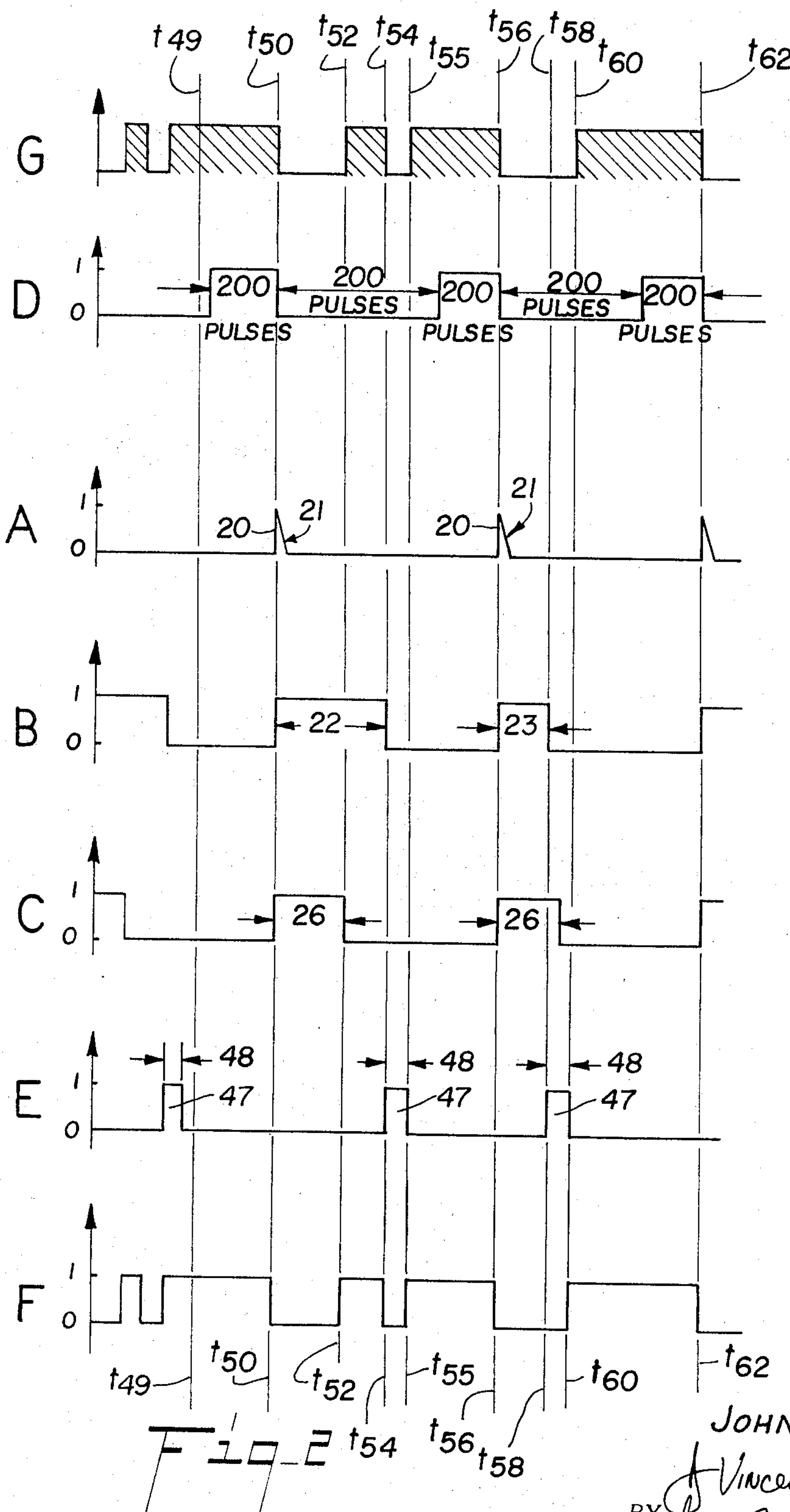
JOHN C. KREPAK
INVENTOR.
BY Vincent Martin
Joe E. Edwards
Jack R. Springgate
ATTORNEYS JOHN C. KREPAK
INVENTOR.
BY J. Vincent Martin
Joe E. Edwards
Jack R. Springgate
ATTORNEYS

JOHN C. KREPAK
INVENTOR.

BY J. Vincent Martin
Joe E. Edwards
Jack R. Springgate
ATTORNEYS

DIGITAL THERMOMETER

BACKGROUND OF THE INVENTION

This invention relates to the measurement of temperature, and particularly to the measurement of human body temperature.

In the art of measuring temperature, a plurality of generally satisfactory apparatus are known for transducing the temperature into an electrical signal of some type and measuring some parameter, such as voltage, current, or frequency, of the electrical signal to determine the value of the temperature. See U.S. Pat. Nos. Bennett et al. 2,974,314; Clement et al. 3,137,169; Meyer 3,163,849; Hamilton 3,274,832; Greenwood 3,277,458; Pinckaers 3,433,124; Whitney et al. 3,475,742; Howell et al. 3,475,750; and Paine 3,541,450. However, it is desirable in some applications to have an inexpensive apparatus which will accurately and rapidly measure temperatures within a relatively narrow, preselected range. For example, hospitals have an acute need for inexpensive thermometers for rapidly measuring, either continually or selectively, the temperature of the human body. None of the prior art is satisfactory for this purpose due to various factors, including expensive components, unwieldy components and inaccuracies inherent in the systems.

This invention provides an improved method and apparatus for accurately measuring temperature in a preselected range of temperatures. The temperature is initially transduced into a first electrical logical signal in which a preselected one of its binary states has a time duration responsive to and indicative of the temperature being measured. A second electrical logic signal is generated having a preselected one of its binary states of preselected time duration. A third electrical logic signal is generated comprised of a plurality of discrete pulses occurring at a constant, preselected frequency, each pulse being indicative of a preselected increment of temperature. The first and second electrical signals are compared. Responsive to the results of such comparison, the pulses comprising the third electrical signal are counted, decoded and displayed as the measured value of the temperature.

It is an object of this invention to provide an improved thermometer for the rapid measurement of temperature within a preselected range of temperatures wherein the temperatures are measured electrically and displayed digitally.

More particularly, it is an object of this invention to provide an improved thermometer for the measurement of human body temperature, quickly, accurately, and, if desired, continually for an extended period of time.

Additionally, it is an object of this invention to provide a thermometer for the measurement of human body temperature which may be constructed inexpensively and yet provide a rapid and accurate determination.

It is yet another object of this invention to provide a thermometer for measuring temperature utilizing a variable electrical resistance transducer wherein errors resulting from non-linearity of such resistance and from changes in the power supply are substantially obviated.

These and other objects and advantages are hereinafter set forth and explained.

BRIEF DESCRIPTION OF THE DRAWINGS

In the drawings, wherein a preferred embodiment and a modification of the invention are shown and wherein like reference numerals indicate like parts:

FIG. 1 is a schematic diagram of the various components comprising an embodiment of this invention.

FIG. 2 is a time-coordinated graphical representation of certain of the electrical signals generated by components of the embodiment of this invention described in FIG. 1.

FIG. 3 is a schematic diagram of the components of the preferred embodiment of this invention.

DESCRIPTION OF THE INVENTION

Figure 4:
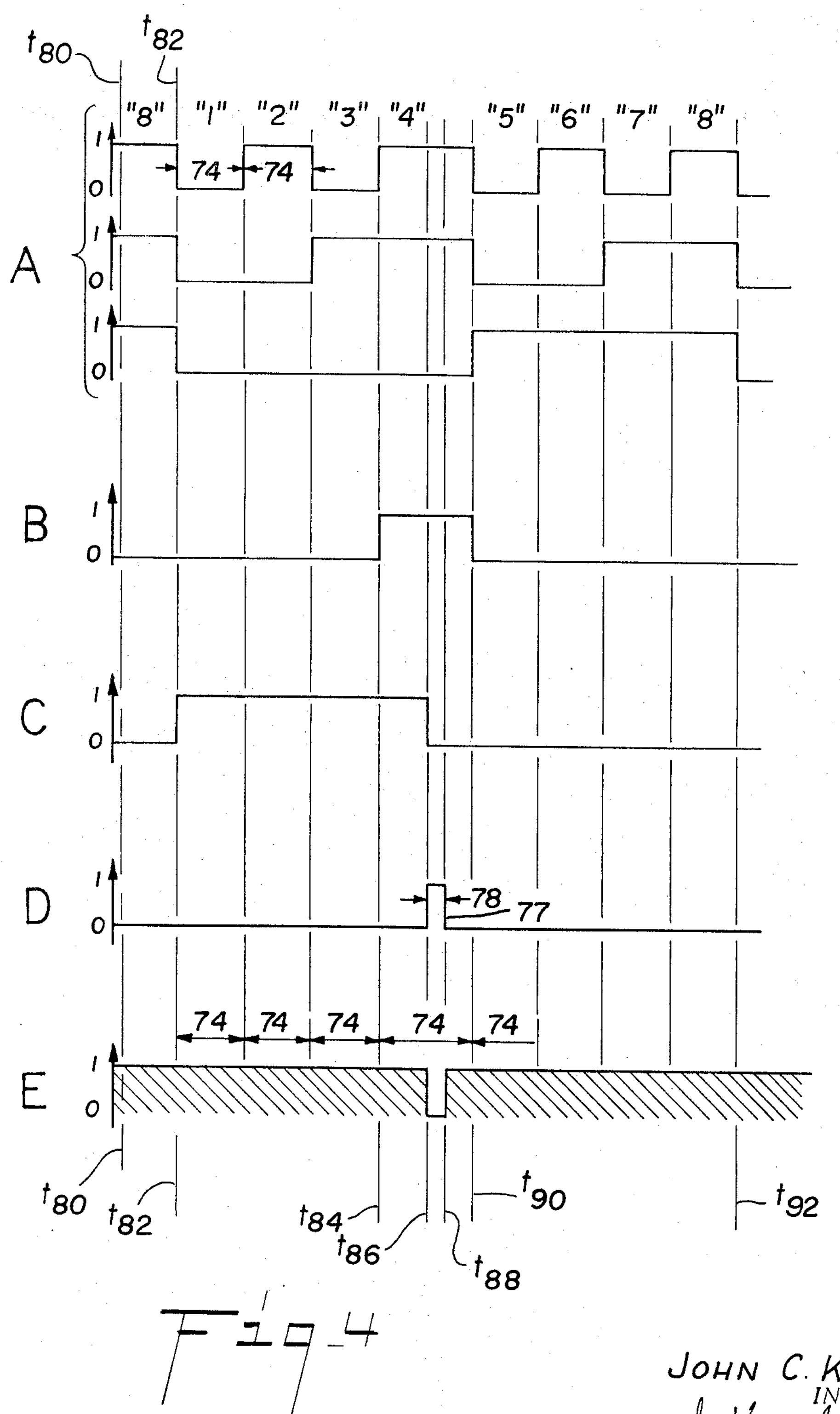
FIG. 4 is a time-coordinated graphical representation of certain of the electrical signals generated by components of the preferred embodiment of this invention described in FIG. 3.

FIG. 1 illustrates schematically an embodiment of this invention. The temperature to be sensed, such as the temperature of the human body, is transduced into an electrical signal responsive to and indicative of said temperature. The means 10 for accomplishing such transformation preferably comprises a thermistor 12, such as a Gulton Ind. 35TD25 (5K ohm epoxy bead negative temperature coefficient), for transducing the temperature being sensed to an electrical resistance, with ohmage proportional to the temperature. It may be desirable to provide an adjustable heat source, such as a heated jell-bath with good thermal conductivity, for the thermistor to lower the difference between the ambient temperature and the temperature of the subject to be measured to reduce the time necessary to obtain a reading. It is also possible to self-heat the thermistor in a standby mode of operation by dissipating power in the device immediately prior to use. The electrical resistance produced by the thermistor is coupled to the input of a means 14 for generating a current proportional thereto. The current source 14 is preferably a differential amplifier, such as a Fairchild $\mu$A723 (voltage regulator integrated circuit used as a constant current source), which generates a current of constant magnitude proportional to the resistance monitored at its input. The current output of current source 14 is coupled to the input of a means 16 for generating a first electrical logic signal in which a preselected one of its binary states has a time duration proportional to the magnitude of the current monitored at its input.

In keeping with the terminology utilized in the art, an electrical logic signal refers to an electrical signal in which the magnitude of one of its parameters, preferably voltage, is always of either a first or second state depending upon whether it is greater than or less than a preselected threshold value. These two states represent the first and second digits of the binary number system. In the following description of the invention, the first state is zero volts and is sometimes referred to as a "0" or "false" value; the second state is in excess of + 2.5 volts and is sometimes referred to as a "1" or "true" value.

Means 16 is preferably a variable "one-shot" device such as is well-known in the art. One-shot 16 has two inputs: the current signal generated by differential amplifier 14 and an electrical triggering signal supplied over line 18. One-shot 16 functions to emit continuously a signal of preselected binary value until it senses a preselected transition of the triggering signal applied to its input over line 18. At such instant, one-shot 16 emits continuously a signal of the opposite binary value for a time duration dependent upon the magnitude of the current applied to its input from differential amplifier 14. Upon the expiration of this time duration, the output of one-shot 16 returns to the first binary value until it again senses the triggering transition of the signal applied to its input over line 18.

FIG. 2 comprises seven time-coordinated graphs illustrating various electrical signals emitted by certain components of the embodiment of this invention illustrated in FIG. 1. (In order to describe better this embodiment of this invention, the graphs are not arranged alphabetically). FIG. 2A graphically illustrates the preferred triggering signal applied over line 18 to the input of one-shot 16. FIG. 2B illustrates relative thereto the electrical signal generated by one-shot 16. Preferably, the output of one-shot 16 is normally of false binary value until such time as one-shot 16 senses a positive-going transition 20 of the pulse 21 applied to its input over line 18. At such point in time, the output of one-shot means 16 switches to true binary value and remains at such value for a time duration (two different time durations are illustrated and numbered 22 and 23) proportional to the magnitude of the current applied to its input from differential amplifier 14. Upon timing out, the output of one-shot 16 again returns to false binary value until the next triggering transition is sensed at its input.

Referring again to FIG. 1, a second electrical logic signal is generated having a preselected one of its binary states of a constant, preselected time duration. The means 24 for generating such second electrical signal is preferably a one-shot identical to one-shot 16 except, as illustrated in FIG. 2C, it emits, responsive to triggering pulse 21, a true signal of constant time duration 26. The constant time duration 26 of the true component of the output of one-shot 24 may be controlled in many well-known ways, including the use of a close tolerance fixed resistor (not shown) and differential amplifier (not shown) similar to the components of first electrical signal generating means 10. The time duration that the second electrical signal remains true is adjusted to be proportional to and indicative of the temperature which denotes the lower end of the preselected range of temperatures.

The outputs of one-shot 16 and one-shot 24 are coupled to the input of a means 28 for determining the difference between the time duration of the true component of the electrical signal generated by one-shot 16 less the time duration 26 of the true component of the electrical signal generated by one-shot 24. Such means 28 functions, as will be hereinafter explained, to inhibit the variable frequency clock 30 and to enable the display means. Clock 30 is a standard device well known in the art which functions to generate continuously an electrical signal comprised of a plurality of discrete pulses, each of which is of a preselected time duration and commences at preselected time intervals. The frequency of the pulses is calibrated relative to the characteristics of the means 10 for generating the first electrical signal and the means 24 for generating the second electrical logic signal so that each pulse represents a preselected increment of the temperature being measured. Standard calibration means 31 are used for this calibration. In this embodiment of the invention, as will be further explained hereinafter, each pulse is representative of 0.1° Fahrenheit.

The output of clock 30 is coupled to the input of a counter 32 or a bank of counters (illustrated in FIG. 1 cumulatively by the numeral 32). Counter 32 is a standard device well-known in the art and functions to tabulate the pulses emitted from clock 30. Counter 32 preferably is a 200-count device which automatically commences tabulating again from zero once it counts the 200th pulse. Electrical signals representative of the tabulated clock pulses are coupled from counter 32 to the input of a decoder 34 which functions to decode the signals received at its input and generate the electrical signals necessary to cause display means 36, when enabled as will hereinafter be explained, to display visually the magnitude of the temperature being measured. The electrical signals generated by counter 32 and applied to decoder 34 are preferably a plurality of logic signals having one of a first or second binary value, which function conjunctively to transmit to decoder 34 information in binary format concerning the number of pulses counted. Decoder 34 decodes this binary information and generates a plurality of electrical signals which drive the various components of display means 36 when display means 36 is enabled.

Counter 32 also functions to emit continuously over line 40 a logical electrical signal which changes state every time a preselected number of pulses are counted by counter 32. In this embodiment of the invention, as illustrated in FIG. 2D, the signal generated by counter 32 over line 40 changes state on every two hundredth pulse.

The continuous logic signal generated by counter 32 over line 40 is coupled to the input of a means 42 for producing the triggering pulse 21 which triggers one-shots 16 and 24. Means 42 is preferably a differentiator, such as a capacitor-resistor combination with diode steering, which functions, is illustrated in FIGS. 2A and 2D, to differentiate the negative-going edge of the signal generated over line 40 from counter 32. This differentiated trailing edge produces a sharp, transient pulse which triggers one-shots 16 and 24.

The previously mentioned means 28 for comparing the output signals of one-shots 16 and 24 and inhibiting clock 30 and enabling display means 36 preferably comprises a display timer means 44 and a logical NOR gate 46. Display timer means 44 is preferably a one-shot which functions responsive to the signal generated by one-shot 16 to emit an output signal in which a preselected one of its binary components is of a constant, preselected time duration. In this embodiment of the invention, as illustrated in FIGS. 2B and 2E, display timer means 44 emits continuously a signal of false binary value until triggered by the negative-going transition of the output signal of one-shot 16, which occurs when one-shot 16 times out and returns to its normal binary state. At that instant, display timer means 44 switches states and emits an enabling and inhibiting pulse 47 of true binary value for a constant, preselected time duration 48, whereupon the output signal reverts to its normal binary state. The logical signal generated by display timer means 44 is coupled both to the input of logical NOR gate 46 and over line 38 to display means 36.

Display means 36 is preferably constructed so that it only displays the information transmitted to it by decoder 34 when it senses (and therefore, is enabled by) a logical signal of true binary value over line 38.

Logical NOR gate 46 is a standard device which emits a signal of false binary value at all times except when electrical logic signals of false binary value are applied to both of its inputs, at which time it emits an electrical signal of true binary value. The input signals to logical NOR gate 46 are illustrated in FIGS. 2C and 2E. The signal generated by logical NOR gate 46 responsive thereto is illustrated in FIG. 2F. Clock 30 is constructed so that it is gated, that is, uninhibited, only when a logical signal of true binary value is sensed at its input. FIG. 2G, wherein the stream of pulses emitted from clock 30 are represented as shaded blocks, illustrates the correlation of the output of clock 30 with its input (FIG. 2F) and the previously discussed electrical signals existing in this embodiment of the invention.

Referring now to FIG. 1 and all of the coordinated graphs comprising FIG. 2, the operation of this embodiment of this invention will be described. Commencing at point in time $t_{49}$, clock 30 is uninhibited (signal F) and is emitting pulses (signal G) at a preselected rate. These pulses are tabulated by counter 32 and on every two-hundredth pulse the output (signal D) of counter 32 changes state. Manifestly, as illustrated in FIG. 2D, on each four hundredth pulse the signal generated over line 40 switches from true to false binary value. Responsive to this negative-going transition, differentiator 42 emits a sharp, transient signal (signal A) which triggers both one-shot 16 and one-shot 24. At this point in time $t_{50}$, the output (signal E) of display timer means 44 is of false binary value and display means 36 is inhibited; there is no information displayed. Additionally, due to the binary values of the two signals applied to the input of logical NOR gate 46, the output (signal F) of logical NOR gate 46 switches to false binary value and clock 30 is inhibited (signal G).

Figure 5:
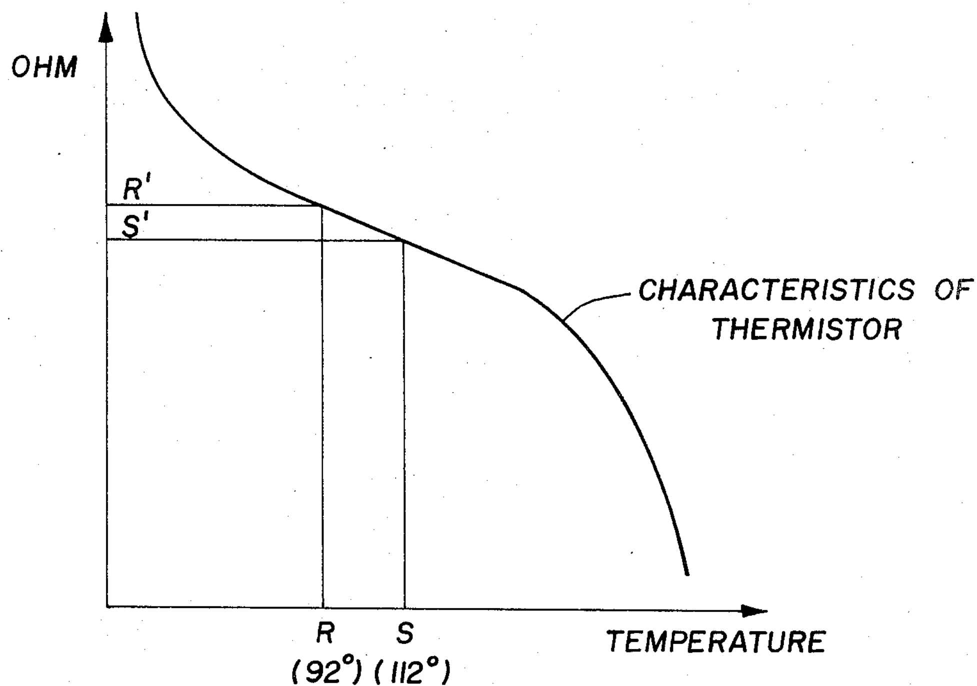
FIG. 5 is a graph of certain of the characteristics of a typical temperature/voltage transducer, wherein ohmage is graphed with respect to temperature.
Figure 6:
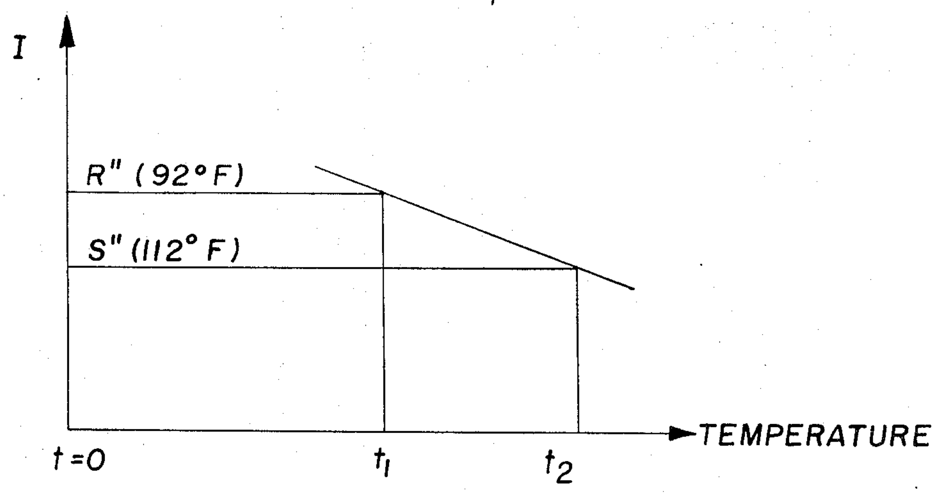
FIG. 6 is a graph of certain of the characteristics of a one-shot apparatus, wherein the amperage of the current supplied to its input is graphed with respect to the time duration of its output.

When the digital thermometer according to this invention is utilized to measure the temperature of a human body, the apparatus will be concerned with the accurate measurement of the limited range of temperatures between 92°F. to 112°F. Referring to FIG. 5, the illustration of the ohmage/temperature characteristics of a typical thermistor reveals there is a portion of the characteristics curve which is substantially linear. A thermistor, such as the previously recommended Gulton Ind. 35TD25, is chosen which has such linearity in the range of 92°(R) to 112°F.(S) and the ohmage characteristics (R',S') of the thermistor are utilized by the rest of the system. Differential amplifier 14 is adjusted so that responsive to an ohmage varying in the range of R' to S' ohms applied to its input, it yields a preselected current in the range R'' to S'' amps. As illustrated in FIG. 6, one-shot 16 is chosen so that a current in the range R'' to S'' amps applied to its input produces, responsive to the triggering pulse (signal A), an output signal having a preselected binary component of time duration varying in the range $t_1$ to $t_2$ seconds.

For purposes of explanation only, assume clock 30 is calibrated to generate pulses at 1,000 Hertz and each pulse represents 0.1°F. 600 pulses will represent 92°F. and 800 will represent 112°F. Assume, as illustrated in FIG. 6, the differential amplifier 14 and the one-shot 16 are adjusted so that responsive to a temperature in the range of 92°F. to 112°F., the true component of the output of one-shot 16 has a time duration such that it times-out in the range from 0.6 seconds to 0.8 seconds. (Preferably, however, as will be hereinafter explained, rather than adjusting one-shot 16 with respect to the clock 30, one-shot 16 is selected and the differential amplifier 14 and clock 30 are adjusted with respect to it.)

One-shot 24 is adjusted by standard means so that its output times out in 0.6 seconds, that is, the time duration indicative of the lowest temperature, i.e., 92°F. in the preselected range of temperatures. Thus, if the temperature to be measured exceeds the lowest temperature in the preselected range of temperatures, one-shot 24 will time out prior to variable one-shot 16 timing out. Assuming now that the time duration between $t_{50}$ and $t_{52}$ in FIG. 2 is 0.6 seconds, one-shot 24 will time-out at $t_{52}$. The output (signal F) of logical NOR gate 46 switches states at that instant and uninhibits clock 30, which commences to emit pulses (signal G). Since clock 30 was inhibited at $t_{50}$ upon counter 32 reaching its 200th count, two-hundred-count counter 32 had cleared itself and now counts from zero the number of pulses emitted by clock 30.

At point in time $t_{54}$, one-shot 16 times out (signal B) and causes display timer means 44 to emit enabling and inhibiting pulse 47 (signal E) of preselected constant time duration 48. Pulse 47 causes the output (signal F) of logical NOR gate 46 to revert to a false binary value and, accordingly, clock 30 is inhibited (signal G). Additionally, pulse 47 is applied to display 36 and enables it so it may display the information provided it by decoder 34, which information consists of the pulses emitted by clock 30 between points in time $t_{52}$ and $t_{54}$ and tabulated by counter 32.

Assuming that the time duration 22 required for one-shot 16 to time out was 0.673 seconds, 73 pulses would have been generated by clock 30 and tabulated by counter 32. Decoder 34 is adapted to take this information and transmit the necessary electric signals to display means 36 to display that the value of the temperature being measured is 7.3°F. in excess of the lower value of temperature (i.e., 92°F.) in the preselected range of temperatures, or 99.3°F.

At point in time $t_{55}$, the output of timer display means 44 reverts to a false binary value (signal E). Accordingly, the output of logical NOR gate 46 again assumes a true binary value (signal F) and clock 30 is again uninhibited and commences emitting pulses (signal G); moreover, display means 36 is de-energized and not allowed to display any information transmitted to it by decoder 34.

Counter 32 continues to count the pulses received at its input and on the 200th pulse causes the signal emitted over line 40 to change states (signal D). Upon counting its next 200th pulse, the logical signal generated over line 40 again changes state and, as previously explained, its negative-going transition (signal D) causes one-shot trigger means 42 to trigger (signal A) one-shots 16 and 24. And the entire procedure is repeated.

It will be apparent that when counter 32 continues to count, it will clear itself upon counting its next 200th pulse. It then counts through another 200-count cycle, the "dummy" cycle, before the apparatus again determines and displays the temperature being measured. This "dummy" cycle aids in insuring the accuracy of the apparatus by providing adequate time for full reset of all the individual elements of the apparatus to their initial state. The need for making special provisions to increase reset drive operation, with its possible injurious effects to the overall operation, is obviated. The cycle rate is rapid enough so that the pulsed display is integrated by the human eye and appears as constant illumination.

Accuracy is also maintained by providing an external calibration adjustment which allows immediate calibration by the operator as often as the operator deems necessary. Calibration is preferably accomplished by pressing a button (not shown) on the housing in which the components are maintained that substitutes a precision resistor (not shown) having a value of resistance equal to the preselected resistance of the thermistor at 98.6°F. A potentiometer included in the calibration means 31 is then adjusted, which in turn adjusts the frequency of the pulses generated by clock 32, until a readout of 98.6°F. is visually displayed.

Assume now that the temperature to be measured is at some value less than 92°F, as indicated by the time duration 23 in FIG. 2B. The time duration 23 of one-shot 16 will be less than the time duration 26 of the output of one-shot 24. At point in time $t_{58}$, one-shot 16 will time out, timer display means 44 will emit its enabling and inhibiting pulse 47 (signal E), and display means 36 is energized. Since clock 30 has never been energized subsequently to counter 32 being cleared to a zero binary output at $t_{56}$, no clock pulse has been received by counter 32. However, display means 36 is preferably constructed such that a zero binary output of counter 32 is decoded as a readout of the lower limit of the preselected range of temperatures, that is, 92.0°F. At point in time $t_{60}$, the enabling pulse 47 generated by timer display means 44 times out and display 36 is no longer energized. Logical NOR gate 46 uninhibits clock 30 and it commences emitting pulses (signal G), but these pulses are not displayed. These pulses are tabulated by counter 32 and on the two hundredth and the four hundredth pulse, the signal generated by counter 32 over line 40 changes state (signal D). On the four hundredth pulse, counter 32 has been cleared and one-shot trigger means 42 generates the trigger pulse 21 (signal A) to reinitiate the entire procedure.

If the temperature to be measured exceeds the range of preselected temperatures, i.e., exceeds 112°F, counter 32 will have automatically commenced recycling and commenced counting again at zero before dispaly means 36 is enabled. However, the logical signal generated on line 40 by counter 32 (signal D) is also connected to means 44 as an inhibit input. If the binary true state of one-shot 16 output is greater than 112°F, it will return to its binary false state during the time duration of the true output represented on line 40 (signal D). An inhibit by line 40 (signal D) causes the absence of pulse 47 and, therefore, the absence of a display. A time duration of the logical true output of one-shot 16, which fails to terminate by the end of the logical state of signal D on line 40, will never terminate because one-shot 16 will be retriggered at the negative transition of signal D, thus reinstating the full time duration of one-shot 16.

FIG. 3 illustrates schematically the preferred temperature measuring apparatus according to this invention. The components of the means 10 for transducing the temperature being measured into an electrical logic signal having its true component of a time duration responsive to the temperature, are identical to those described with respect to the embodiment illustrated in FIG. 1, with the exception that one-shot 16 is an integrated circuit type with logical inputs that can be logically controlled to give a one-shot output at the desired time (this is an integrated circuit such as Texas Instruments SN74121). However, rather than utilizing a variable frequency clock, a fixed frequency, crystal controlled, digital clock 70 is incorporated. Clock 70 functions to generate continuously an electrical signal comprised of a plurality of discrete pulses, the duration of each pulse and the time interval between pulses (i.e., frequency of occurrence of the pulses) is preselected so that each pulse is indicative of a preselected increment of temperature. As in the embodiment of this invention described with respect to FIG. 1, the output of clock 70 is coupled to the input of a two-hundred-count counter 32 and the logical output of counter 32 is coupled to the input of a display decoder 34 which places the information in the proper format to cause it to be displayed by display means 36.

The output of counter 32 is also coupled to the input of an eight-count (3-bit) counter 72. Eight-count counter 72 is preferably responsive only to the most significant bit counted by counter 32 in its 200-count cycle. Thus, responsive to every two hundredth pulse tabulated by counter 32, counter 72 counts one digit; after counting eight digits it commences anew at zero. Three electrical signals are generated by counter 72, each of which has one of a first or second binary value. These signals function conjunctively, as illustrated in FIG. 4A wherein the time duration 74 is representative of the time required for clock 70 to emit two hundred pulses, to transmit binary information to a means 74 for decoding such information and generating an enabling pulse to the means 76 for inhibiting and uninhibiting clock 70 and for enabling display means 36. Decoder and enabling means 74 is a standard device, such as a triple three input NAND gate (such as a TISN7410), which functions to emit continuously an electrical signal of first or second binary value. Such electrical signal, as illustrated in FIG. 4B, preferably is normally of false binary value. Responsive to a preselected logical signal sensed at its input, such as the logical signal denoting the fourth digit counted by counter 72 as illustrated in FIG. 4A, the output of decoder and enabling means 74 switches states and becomes true. The output remains at a true binary value until the next count ("5") is sensed at its input, whereupon it reverts a false binary value.

The logical 3-bit output of counter 72 is also coupled to a trigger input of one-shot 16, which is logically preconditioned so that a negative transition of the logic signal on line 75 denoting the first ("1") digit counted by counter 72 serves to thereby trigger one-shot 16. As previously described with respect to the embodiment illustrated in FIG. 1, the output of one-shot 16 instantaneously switches binary states and commences timing out. The time required for one-shot 16 to time out is responsive to the constant current applied to its input from differential amplifier 14 which, as previously explained, is responsive to the temperature being measured.

Inhibiting and enabling means 76 is a standard device, such as an integrated circuit one-shot (TISN74121), which emits continuously an electrical signal of first or second binary value until triggered by the proper logic sequence on the three trigger inputs, whereupon it emits a pulse of opposite binary value for a preselected time duration, as will be explained hereinafter.

As illustrated in FIGS. 4B, 4C and 4D, inhibiting and enabling means 76 preferably functions to emit continuously a logical signal of false binary value until it senses at its inputs a logical signal of true binary value from decoder 74 and, simultaneously therewith, a negative-going transition of the logical signal generated by one-shot 16. Inhibiting and enabling means 76 then generates a true inhibiting and enabling pulse 77 for a preselected time duration 78.

Clock 70 preferably is constructed so that it is uninhibited when a logical signal of false binary value is sensed at its input and is inhibited when a logical signal of true binary value is sensed at its input. Display means 36 is preferably constructed so that it is enabled only when a logical signal of true binary value is sensed at its input from inhibiting and enabling means 76.

Referring now to FIG. 3, and the coordinated graphs comprising FIG. 4, the operation of this preferred embodiment of the invention will be described. Commencing at point in time $t_{80}$, the enabling signal (signal D) applied to the input of clock 70 is of false binary value and, accordingly, clock 70 is emitting pulses (signal E). Counter 32 is continuously tabulating these pulses from zero to 200 and repeating the tabulation cycle. On each 200th pulse, a signal is transmitted from counter 32 to counter 72 and, as is illustrated at point in time $t_{82}$, the binary output of counter 72 changes one digit. The binary output of counter 72 is decoded by decoder 74, which emits an electric logic signal responsive to the fourth digit counted in the cycle. Also, one-shot 16 is triggered and commences to time out (signal C) upon receipt from counter 72 a 3-bit binary signal indicative of the first digit counted in the cycle.

Thermistor 12 is chosen and differential amplifier 14 is adjusted such that the time duration of the true component of the output of one-shot 16 times-out during a preselected count period of the eight-count counter 72: the count that decoder 74 has enabled (signal B) inhibiting and enabling means 76. Assuming that clock 70 is emitting pulses at 1000 Hertz and each pulse is representative of 0.1°F, 600 pulses (the end of the "third" count of counter 72) represents 92°F. and 800 pulses (the end of the "fourth" count of counter 72) represents 112°F. Thus, as illustrated in FIGS. 4B and 4C, thermistor 12 is chosen and differential amplifier 14 is adjusted so that one-shot 16 times out during the "fourth" count of counter 72.

The enabling pulse generated by decoder and enabling means 74 performs the same function with respect to this preferred embodiment of this invention as does the "second electrical signal of constant time duration" with respect to the embodiment of this invention illustrated in FIG. 1: it provides a signal representative of the temperature denoting the lower end of the preselected range of temperatures with which the variable signal representative of the temperature being measured can be compared. Additionally, however, since the enabling pulse generated by decoder and enabling means 74 lasts only until 200 pulses have been counted by counter 32, it also functions to provide a signal representative of the temperature denoting the upper end of the temperature being measured.

If one-shot 16 times out during such fourth count, inhibiting and enabling means 76 generates an inhibiting and enabling pulse 77 (signal D) responsive to the negative-going transition of the output of one-shot 16 (signal C). Accordingly, clock 70 is inhibited for the duration 78 of said enabling pulse (signals D and E). The number of pulses tabulated by counter 32 — which will be between zero and two hundred pulses — and the instant clock 70 is so inhibited will be decoded and displayed on display means 36 for the duration 78 that display means 76 is enabled.

Upon the inhibiting and enabling pulse 77 (signal D) timing out at $t_{88}$, clock 70 again commences emitting pulses. Counter 32 continues in its tabulation and at $t_{90}$ reaches the count of 200. Counter 32 is thus cleared and commences another cycle. And when counter 72 completes its eighth count, the entire procedure will repeat itself. One-shot 16 and one-shot 76 trigger inputs are logically sequenced such that a sensed temperature below 92.0°F shall be displayed as 92.0°F and a sensed temperature greater than 112° F shall exhibit no display.

Initial and in-use calibration of this preferred embodiment of this invention is accomplished by substitution for the thermistor a precision resistor (not shown) having a resistance equal to the preselected resistance of the thermistor at 98.6°F. and adjustment of the differential amplifier 14, which varies the time duration of one-shot 16, until the preselected readout is displayed.

This invention thus provides an improved thermometer which rapidly and accurately measures temperature within a preselected range of temperatures, and, as such, is especially useful to measure, either selectively or continuously, the temperature of beings. The temperature is transduced to an electrical signal and digitally determined. It is visually displayed. Since the time duration of the electrical signal representative of the temperature being measured is compared with a second electrical signal of preselected, constant time duration, the means for transducing the temperature to the first electrical signal and the components of the apparatus do not have to be able to measure a wide range of temperatures. The transducer and the other components of the device, including the analogic elements, are thus limited to their most linear regions of operation and the apparatus is extremely accurate. In the first described embodiment of this invention, since both the first and second electrical signals are a function of the supply voltage, changes in the supply voltage do not effect the accuracy of the reading. In the second described, preferred embodiment of this invention, the accuracy of the temperature measurement is substantially dependent on the accuracy of the crystal clock — a very accurate device. Another important aspect of the accuracy of this invention is that the external calibration adjustment allows immediate calibration whenever the operator deems it necessary. And the utilization of a "dummy cycle" allows time for full reset of all the individual circuits to their initial state.

It will now be apparent to those skilled in the art that various changes may be made in the construction of the thermometer without departing from the spirit of the invention. For instance, the various logical components of the apparatus may be changed so long as the altered components accomplish the same function. Particularly, the binary states of the various signals generated by the logical components can be varied in a myriad of combinations. Accordingly, the foregoing disclosure and description of the invention are illustrative and explanatory thereof, and various changes in the thermometer may be made within the scope of the appended claims without departing from the spirit of the invention.

What is claimed is:

1. An apparatus for measuring temperature within a preselected range of temperatures, comprising:

means for generating a first electrical signal having a time duration responsive to and indicative of the value of said temperature, means for generating a second electrical signal having a constant, preselected time duration;

means for generating an electrical clock signal comprised of a plurality of discrete pulses occurring at a preselected frequency, wherein each pulse is representative of a preselected increment of temperature;

means connected to the output of said clock for counting said pulses; and means connected to the outputs of said means for generating said first electrical signal and said means for generating said second electrical signal and connected to said clock for comparing said first and second electrical signals and for gating said clock signal to said counting means responsive to the time durations of said first and second electrical signals.

2. An apparatus according to claim 1, including:

means for determining from said gated pulse signals counted by said counter said temperature being measured; and means for displaying said temperature.

3. An apparatus according to claim 1, wherein said means for transducing said temperature into a first electrical signal includes:

means for transforming said temperature into an electrical resistance proportional thereto;

means for generating an electrical signal having a current the magnitude of which is proportional to the magnitude of said resistance; and means for generating a first electrical logic signal in which a preselected one of its first and second binary states has a time duration proportional to said magnitude of said current.

4. An apparatus according to claim 1, wherein said counter means counts a preselected number of pulses and then recycles, and emits electrical signals denoting the pulses counted.

5. An apparatus according to claim 1, including means for generating a triggering signal; and wherein said means for transducing the temperature being measured into said first electrical signal operates responsive to said triggering signal.

6. An apparatus according to claim 5, wherein:

said counter means counts a preselected number of pulses and then recycles, and emits electrical signals denoting the pulses counted; and said triggering means triggers said means for generating said first electrical signal responsive to a preselected electrical signal emitted from said counter means denoting that a preselected number of pulses has been counted.

7. An apparatus according to claim 2, including:

means for enabling said display means responsive to said first electrical signal.

8. An apparatus according to claim 1 wherein:

said first electrical signal is a logic signal which, from a selected instant of time, is one of a first and second binary states for a time duration responsive and proportional to said temperature and then switches states to the other of said first and second states;

said second electrical signal is a logic signal which, from said selected instant of time, is one of a first and second binary states for a preselected constant time duration and then switches states to the other of said first and second states; and said preselected constant time duration of said logic component of said second electrical signal being proportional to and indicative of the preselected temperature which denotes the lower end of said preselected range of temperatures.

9. An apparatus according to claim 8, including:

means for generating a triggering signal; and said means for generating said first electrical signal and said means for generating said second electrical signal each are connected to the output of said triggering means and operate repetitively responsive to said triggering signal, said preselected instant of time being the instant said triggering signal is sensed.

10. An apparatus according to claim 9, wherein:

said clock signal is gated to said counting means for the period of time that said time duration of said first electrical signal exceeds said time duration of said second electrical signal;

said determining means determines from said pulses counted by said counter during said gating interval of time the degrees of temperature that said temperature being measured exceeds said preselected temperature which denotes the lower end of said range of temperatures and adds thereto said preselected temperature;

said gating means enables said display means for a preselected time duration responsive to said first electrical signal switching to said other of said first and second states; and said clock signal is not gated to said counting means for the preselected time duration that said display means is enabled.

11. An apparatus for measuring temperature within a preselected range of temperatures, comprising:

means for transducing said temperature into an electrical signal having a magnitude proportional thereto;

means for generating a triggering signal;

means connected to the outputs of said transducing means and said triggering means for generating a first electrical signal having an absolute magnitude which, from the instant of time said triggering signal is sensed, continuously is either in excess of or less than a preselected threshold magnitude for a time duration responsive and proportional to said transduced electrical signal and then, upon expiration of said time duration, changes substantially instantaneously to a magnitude which is the other of in excess of or less than said threshold magnitude;

means connected to the output of said triggering means for generating a second electrical signal having an absolute magnitude which, from the instant of time said triggering signal is sensed, continuously is one of in excess of or less than said preselected threshold magnitude for a preselected time duration and then, upon expiration of said constant time duration, changes substantially instantaneously to a magnitude which is the other of in excess of or less than said threshold magnitude;

said means for generating said first electrical signal and said means for generating said second electrical signal each being adapted to function repetitively responsive to said triggering signal supplied thereto;

a clock for emitting repetitively pulses at a preselected constant frequency, each of said pulses being representative of a preselected increment of temperature;

a counter connected to the output of said clock;

means connected to the outputs of said first and second electrical signal generating means and connected to the input of said clock for comparing said first and second electrical signals and for selectively gating responsive thereto said clock pulses to the input of said counter;

said clock pulses being gated during the period of time that said time duration of said first electrical signal exceeds said time duration of said second electrical signal; and the output of said clock being connected to the input of said triggering means and said clock and said triggering means being adapted so that said triggering means triggers said means for generating said first electrical signal and said means for generating said second electrical signal repetitively responsive to a preselected number of pulses being counted by said counter.

12. An apparatus according to claim 11 including:

means connected to the output of said counter for determining from said pulses counted by said counter during said gating time interval the temperature being measured; and display means connected to the output of said determining means for displaying visually said temperature.

13. An apparatus according to claim 12, wherein:

said preselected time duration of said second electrical signal is proportional to and indicative of a preselected temperature which bounds the lower end of said preselected range of temperatures wherein said temperature being measured is determined by determining the degrees of temperature that it exceeds said preselected temperature.

14. An apparatus according to claim 11, including:

means for adjusting said frequency of said pulses comprising said clock signal;

means for adjusting the characteristics of said means for generating said first electrical signal; and means for adjusting the characteristics of said means for generating said second electrical signal;

whereby said duration of said first electrical signal, when indicative of any temperature within said preselected range of temperatures, is within a preselected range of durations of time.

15. An apparatus for measuring temperature within a preselected range of temperatures, including:

a clock for emitting repetitively pulses at a preselected constant frequency, each of said pulses being representative of a preselected increment of temperature;

means for transducing said temperature into a first electrical logic signal which, from a first selected instant of time, is one of a first and second binary states and remains at said state for a time duration responsive and proportional to said temperature and then switches states to the other of said first and second states;

a counter connected to the output of said clock;

means for generating a second electrical logic signal which, from a second selected instant of time, is one of a first and second binary states and remains at said state until a first preselected number of clock pulses are counted by said counter and then switches states to the other of said first and second states, said first preselected number of pulses being indicative of said preselected range of temperatures;

said means for generating said first electrical signal at said first selected instant of time and said means for generating said second electrical signal at said second selected instant of time each being adapted to function repetitively responsive to triggering signals applied thereto;

means connected to the output of said counter and to the input of said means for generating said first electrical signal and to the input of said means for generating said second electrical signal for determining when said first preselected number of pulses and a second and third preselected number of pulses have been counted by said counter and emitting triggering signals responsive thereto, said first selected instant of time and said second selected instant of time occurring when said second and third preselected number of pulses, respectively, have been emitted by said clock means and counted by said counter;

said means for generating said first electrical signal and said means for generating said second electrical signal being responsive to said second and third preselected number of pulses having been counted by said counter whereby if said temperature being measured is within said preselected range of temperatures, the termination of said time duration of said logic component of said first electrical signal will occur during the period of time that said logic component of said second electrical signal remains at said one of a first and second binary states awaiting a triggering signal indicating that said counter has counted said first preselected number of pulses; and means connected to the output of said first and second electrical signal generating means and to the input of said clock for comparing said first and second electrical signals and for selectively gating responsive thereto said clock pulses to the input of said counter;

said clock pulses being gated to said counter during the interval of time that said second electrical signal becomes one of a first and second binary states responsive to a triggering signal being applied thereto at said first selected instant of time and said first electrical signal switching binary states responsive to the termination of said time duration which is proportional to the temperature being measured.

16. An apparatus according to claim 15, including:

means connected to the output of said counter for determining the temperature being measured; and means connected to the output of said temperature determining means for displaying digitally said temperature being measured.

17. An apparatus according to claim 16, wherein:

said means connected to the output of said counter for determining the temperature being measured decodes electrical signals generated by said counter and determines from the number of pulses counted by said counter during said gating interval of time the degrees of temperature that said temperature being measured exceeds the magnitude of temperature which denotes the lower end of said preselected range of temperatures and adds thereto said temperature denoting the lower end of said range of temperatures;

said comparing and gating means enables said display means for a preselected time duration responsive to said first electrical signal switching to said other of said first and second states upon termination of said time duration proportional to the temperature being measured; and said clock signal is not gated to said counter for the preselected time duration that said display means is enabled.

18. A method of measuring temperature within a preselected range of temperatures, including the steps of:

generating a first electrical signal having a time duration responsive to and indicative of the value of said temperature;

generating a second electrical signal having a constant, preselected time duration;

generating an electrical clock signal comprised of a plurality of discrete pulses occurring at a preselected frequency, wherein each pulse is representative of a preselected increment of temperature;

counting said pulses;

comparing said first and second electrical signals and gating said clock signal to said counting means responsive to the time durations of said first and second electrical signals; and determining from said gated pulse signals counted by said counter said temperature being measured.

19. A method of measuring temperature within a preselected range of temperatures, including the steps of:

transducing said temperature into a first electrical logic signal which, from a selected instant of time, is a preselected one of a first and second state for a time duration indicative of said temperature;

producing a second electrical logic signal which, from said selected instant of time, is a preselected one of a first and second state for a preselected time duration;

generating pulses repetitively at a preselected frequency, each pulse being representative of a preselected increment of temperature;

comparing said first electrical signal with said second electrical signal and gating said pulses for the interval of time equal to said duration of said logic component of said first electrical signal less said time duration of said logic component of said second electrical signal;

counting said gating pulses;

determining from said number of gated pulses counted the temperature being measured; and displaying said temperature.

* * * * *